United States Patent [19]

Antal et al.

[11] Patent Number: 4,567,916
[45] Date of Patent: Feb. 4, 1986

[54] HIGH PRESSURE HOSE SUITABLE FOR CONVEYING GASES AND GAS-CONTAINING FLUIDS

[75] Inventors: Sándor Antal; Zoltán Bartha; Péter Görgényi; Ferenc Koszó; Béláné Magyarosi, all of Budapest, Hungary

[73] Assignee: Taurus Gumiipari Vallalat, Budapest, Hungary

[21] Appl. No.: 412,452

[22] Filed: Aug. 27, 1982

[30] Foreign Application Priority Data

Sep. 3, 1981 [HU] Hungary ............................ 2551/81

[51] Int. Cl.⁴ .............................................. F16L 55/00
[52] U.S. Cl. ..................................... 138/104; 138/109; 138/139
[58] Field of Search .............. 138/103, 104, 137, 138, 138/139, 140, 141, 153, 177, 178, 109

[56] References Cited

U.S. PATENT DOCUMENTS

| | | | |
|---|---|---|---|
| 3,581,775 | 6/1971 | Dahl | 138/104 |
| 3,972,223 | 8/1976 | Torghele | 138/104 X |
| 4,153,079 | 5/1979 | Ambrose | 138/104 |
| 4,259,553 | 3/1981 | Tanaka et al. | 138/104 X |
| 4,349,049 | 9/1982 | Silvey | 138/104 X |

FOREIGN PATENT DOCUMENTS 2117479  10/1983  United Kingdom ............... 138/104

*Primary Examiner*—James E. Bryant, III
*Attorney, Agent, or Firm*—Gabriel P. Katona

[57] ABSTRACT

A flexible, multilayer high-pressure hose with a diameter over 50 mm. It is suitable for conveying gases and gas-containing fluids. The hose contains a structure to vent gases and it is stable to the environment and to the material being conveyed therethrough.

15 Claims, 6 Drawing Figures

HIGH PRESSURE HOSE SUITABLE FOR CONVEYING GASES AND GAS-CONTAINING FLUIDS

BACKGROUND

The present invention relates to a high pressure hose, built up of several layers, having generally a diameter greater than 50 mms and being suitable for conveying gases and gas-containing fluids.

It is known, that continually newer demands are made by technical developments to improve the technical products which are needed for the developments. Thus for example the development of marine oil mining has brought forth the demand for flexible hoses suitable for conveying the crude oil produced. Materials from underground sources such as crude oil, earth gas, water, $H_2s$ and other aggressive materials flow through such hoses. These hoses have to show extraordinary complex properties, because the mentioned materials attack the hose from the inside with 100 atmospheres or even higher pressure and at the producing temperature of the well. At the same time the hose is exposed from the outside to the effect of sea-water in off shore wells; it has to bear the waves of the environment, for example the sea and the watercolumn-pressure corresponding to the depth of the sea. Besides there is the further problem, that standardization of the hoses cannot be practically accomplished since each well used to extract the mentioned materials creates different interior and exterior loads.

In the case of oil mining, especially "off-shore" mining in addition to stiff pipe systems flexible lines are also used. Various flexible pipes have been worked out for conveying gas-free oil. These hoses resist high-pressure and in special cases they resist the high axial pull-force and radial pressure-force (external pressure). Resistance to the listed loads are generally ensured with reinforcing ply systems of two main types. One of the ply systems consists of plies of even numbers, in which steel wires, profile wires or wire cords applied with a high pitch helically in opposite direction are placed under an angle. Resistance to radial forces (with hoses laid on the sea bottom) is increased with one or more plies formed from helically wound wires with a small pitch. The plies are connecting or non connecting steel profile bands or glass-resin banded systems. Resistance to axial pull force is given by the coworking of the above two ply systems. In order to separate the individual carcass reinforcing plies and embedding respectively, usually rubber or plastic layers are applied. The sealing ability of the hose is ensured by a rubber or plastic tube resisting the aggressive effect, such as high temperature of the medium to be conveyed because its heat resistance is higher, than the temperature of the medium. In addition the hose has an external rubber or plastic cover protecting the reinforcing plies from the corrosive effect of the external medium, e.g. water, air and sea water. Such hoses are described in French Pat. No. 2,210,266 as well as in the Hungarian Pat. Nos. 169,115 and 172,426.

Though the hoses described above are suitable for conveying gas-free oil they are not suitable for conveying a gas-containing medium. The reason for this is that the gas to be conveyed diffuses through tube layers made of plastics or synthetic rubber which are used to ensure sealing and penetrates among the structural elements of the hose, breaking them causing failure and blistering. Such a phenomenon is manifested by the bulging of the outer plastic or synthetic rubber cover layer, as well as the blistering of the internal tube after the cessation of the internal pressure of the medium to be conveyed.

For stopping the deteriorating effect of the gas diffused into the hose structure several methods have been developed. Thus, for example, for checking the bulging of the cover layer, this layer is pierced at several places enabling the escape of the gas accumulated underneath. Such a solution is described in French Pat. No. 2,286,331. The drawback of this method is, that the external environment such as moisture and, sea water can penetrate through the perforated holes as far as the steel wire plies and cause corrosion. According to another method the path of gas diffusion through the individual plastic or rubber layers is ensured by gradually increasing the gas permeability of the polymer layers situated outward from the tube. Such a method is disclosed in U.S. Pat. No. 4,120,324. The disadvantage of the above method is partly that in practice the adjustment of the permeability gradient is very difficult, since the choice of suitable raw materials resistant to the materials conveyed is very small. Part of the problem is that the material conveyed has generally a higher temperature than the environment, thus, in the hose a decreasing temperature gradient sets in and it is known that the rate of gas diffusion is greatly increased with increasing temperature.

Further methods are given in Swiss Pat. No. 569,909, in Austrian Pat. No. 331,593 and in the British Pat. No. 1,409,096, according to which the gas diffusion is prevented by a corrugated steel pipe situated as an internal layer of the hose. The draw back of this method is that the manufacturing process is difficult to accomplish, and the corrugated internal surface greatly increases the flow resistance of the material conveyed.

The object of the present invention is to develop a hose without having the disadvantages detailed in the foregoing. From the drawbacks of the known methods it is apparent that there is a need for a hose which can satisfactorily resist internal and external deteriorating effects caused by the external environment and the medium flowing therethrough.

SUMMARY OF THE INVENTION

The method of this invention provides a hose with a duplex safety system wherein the hose wall is made of rubber or of a combination of rubber and plastics, with reinforcing plies resistant to internal and external pressure and axial pull force. In addition one or more gas conducting layers are formed, where the gases which diffuse therein can accumulate and leave on the formed aerating spots. Thus no considerable amount of gas can diffuse into the hose wall over the gas-conducting layer or layers and a gas pressure causing blistering in the case of the known solutions cannot develop. In the hose the gas-conducting layer can be the structure of the reinforcing wire cord itself, after having been made gas-conductive. Alternatively a layer or layers can be built in separately. Separate (extra) layers/s/ are built in only if the hose-body between the tube and the reinforcing of the wire cord is so thick, that the risk of separation within this thick wall is still very high. In this case one or more intermediate gas-conducting layers have to be built in the layers underneath the wire cord in the hose wall. The wire cord can be made gas-conducting by the appropriate selection of the curing conditions so that no embedding rubber surrounding the wire cord is allowed to penetrate into the interior of the wire cord structure, i.e. the space among the wires forming the wire cord. In this way the cavity in the interior of the wire cord can collect and conduct the gases.

The gas-conducting layer built-in separately in the hose structure can be formed of textile cord or fabric plies. The textile layer is not solid, but of a loose structure which is cleared (gas permeable) thus these plies form a gas-collecting and gas-conducting layer. In order to ensure a cleared (gas-permeable) layer it is preferable to build-in a textile which is not rubberized or which is rubberized only on the surface. The building-in of this layer results in the so-called "pipe in the pipe" system, meaning that the finished hose consists of two hoses, built tightly to one another, which are practically not fixed with adhesion to one another.

The gas-conducting layer can also be made of steel cord, the internal gaps of which are not filled in with the surrounding embedding rubber, so it becomes gas conducting. In the case of using steel cord no "pipe in the pipe" structure is formed, since the steel cord is bound practically with adhesion to the enclosing rubber layer.

Consequently, with these gas-conducting layers, that gases diffused into the hose body accumulate primarily in the mentioned layer/s/ and flows along the gas-conducting layer. The eduction of the gas from these layers takes place through the one or more gas-educting valves built-in into the coupling or through one or more canals formed along the hose-length. Such canals, for example, can be made of cords of loose structure (suitable for conducting gases) or fabrics passing through the individual layers of the hose placed diagonally, connecting the gas-conducting layer with the external surface of the hose.

By means of this type of hose according to this invention, the gas can be conducted outward the gas-conducting layer, but the danger of blistering of the part underneath the gas-conducting layer still exists. For eliminating this a so called internal backing layer is applied.

For the internal backing of the hose structure a flexible pipe, preferably a stripwounded metal pipe with an external diameter identical with the internal diameter of the tube of the hose can be used. This stripwounded metal pipe need not be of a sealed profile, because the sealing ability of the hose is ensured by the tube layer being over it. The layers must be, however, chemically resistant to the medium to be conveyed.

Due to its strength, the stripwound metal pipe resists the blister developing forces appearing in the interior of the hose body and acting inwards. Failure of the hose is prevented by pressing the internal part of the hose body between the stripwound metal pipe and steel wire cord, thus preventing blistering on the interior of the hose body. The stripwound metal pipe has also a role in the radial loadability of the hose, due to axial or external pressure. Both loads cause a decrease of the diameter of the reinforcing plies, ruining the hose. On account of its strength, the internal supporting flexible pipe (stripwound metal pipe) can resist, to a certain extent, the pressure of the main reinforcing plies and can stop the decrease of their diameter. If the magnitude of the crushing force surpasses the strength of the flexible steel pipe, an extra helical ply of small pitch has to be placed under the main reinforcing plies in the hose wall to resist to the radial forces. This can be prepared of steel wire or of glass fibers impregnated with epoxy resin.

BRIEF DESCRIPTION OF THE DRAWINGS

For the sake of better understanding, the invention is shown in detail on the attached drawings.

Figure 1:
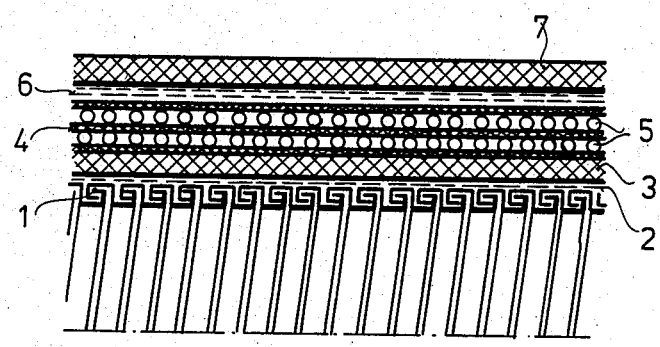
FIG. 1 is a side sectional view of an embodiment of the hose of this invention.

The differentiating characteristic of the hose shown in FIG. 1 is that the main reinforcing plies 5 themselves serve to conduct the gases diffusing into the hose wall.

The functions of the structural elements of the internal pressure resisting hose shown in FIG. 1 are as follows:

In the interior of the hose there is a flexible pipe made of metal or plastics. Its form can be of various kind. It is however essential that the pipe have adequate strength against the external pressure. In FIG. 1 the flexible pipe 1 shown is prepared by winding a profile band (i.e. corrugated). The purpose of this internal stripwound pipe 1 is to stop blister development caused by gases diffused into the hose wall when the pressure decreases in the interior. In addition, the pipe 1 a role in the axial loadability of the hose. If the hose is axially pulled without internal pressure, the diameter of the reinforcing plies 5 decreases and the hose gets ruined. The internal flexible stripwound metal pipe helps prevent the diameter decrease of the main reinforcing plies 5.

The function of the tube 3 is to ensure the gas and fluid sealing ability of the hose. It is prepared from a flexible plastomer or elastomer of low gas-permeability which is resistant to chemical effects of the medium conveyed. Since the tube 3 is situated between two layers of low elongation (pipe 1 and plies 5) it is essential that its volume shall not change due to swell.

If the swell exceeds 10%, the tube 3 can crush the flexible corrugated metal pipe 1.

A fabric layer 2 prevents the tube 3 from affecting the flexibility of the pipe 1 by keeping it from flowing into the gaps of the internal corrugated metal structure thereof while heating during production.

The embedding layers 4 are made of rubber and separate the reinorcing plies 5 in order to protect them from wearing each other during flexing. The reinforcing plies 5 can be used for conducting the gases because they are fabricatd with wire cord structure and their total cross-section cannot be filled massively with the material of the embedding layer 4 at the applied curing pressure.

The main reinforcing plies 5 are usually steel wire cords which ensure the strength of the hose against loads resulting from the internal pressure.

Fabric carcass 6 and rubber cover 7 protection the hose against external loads.

Figure 2:
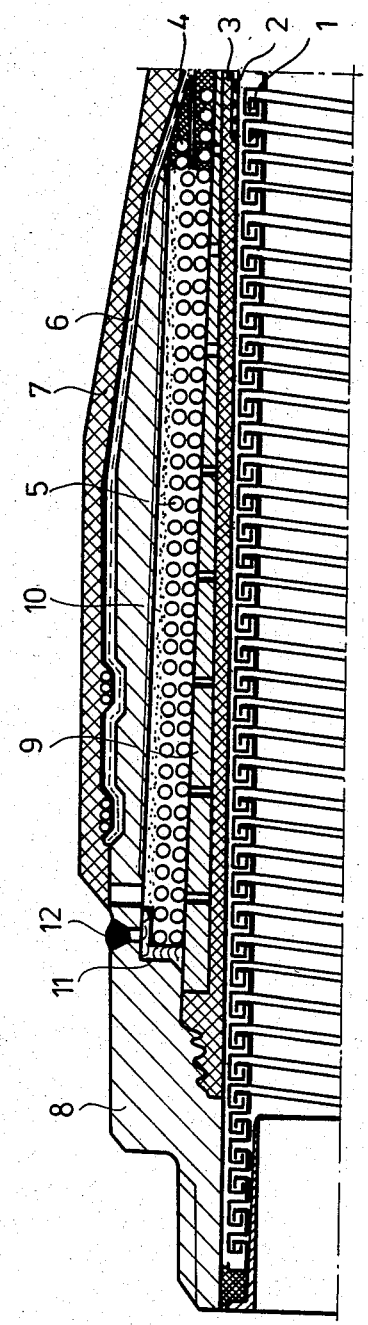
FIG. 2 is a side sectional view of the hose of this invention showing a coupling element.

FIG. 2 illustrates a hose provided with a coupling element 8 and a tapered sheath of thread shape 9. The bond between the main reinforcing plies 5 and the coupling element 8 is ensured by the adhesive layer 10. This invention, however, is not restricted to this type of coupling.

The tube 3 is fabricated of the best possible gas-sealing, flexible material. A certain amount of gas, however, penetrates all materials. The gas thus diffused can be lead via gaps in the main reinforcing plies 5 for, example, into a chamber 11 formed in the couplings 8 and comprising the gas-collecting layer. The gas-collecting layer of the chamber 11 can, for example, be made of raw textile or nonrubberized steel cord. From this area the gas can move off via a check valve 12. The simplest shape of the check valve 12 can be attained by applying an "O" ring running along the external circumference.

Figure 3:
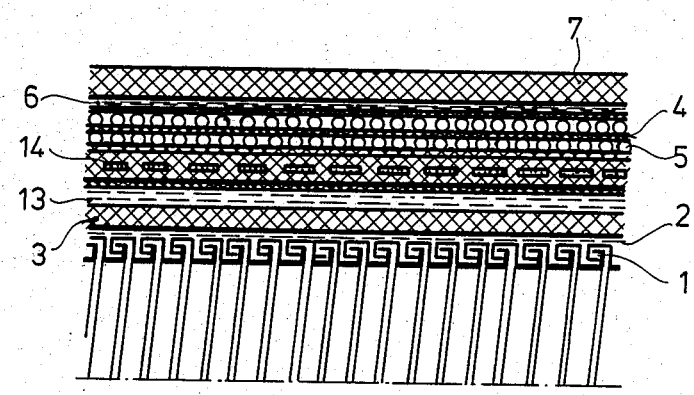
FIG. 3 is a side sectional view of an embodiment of this invention showing plies that are resistant to axial pull force.

In FIG. 3 another hose is shown which is resistant to internal pressure and axial pull force. Resistance to pull force is ensured by the plies 14, which are wound helically with a small pitch. Resistance to the internal pressure is ensured by the main reinforcing plies 5. A gas-conducting layer 13 is built in over the tube 3 and ensures fluid-and gas-tightness. The gas-conducting layer 13 is made of nonrubberized, raw fabric or cord-fabric, the structure of which is not solid but open and thus it forms a gas-collecting and gas-conducting layer. The gas flows through the gas-conducting layer 13 to a gas-outlet and to a coupling, respectively, not illustrated in FIG. 3. The building-in of the gas-conducting layer 13 results in a so-called "pipe-in the pipe" structure, consisting of two pipes, which are not fixed by adhesion to each other: from the lower pipe consisting of the internal flexible stripwound metal pipe 1 and a tube 3, and the upper flexible pipe consisting of the other elements. The gas-conducting layer 13 can also be made of steel cord, its internal gaps are not filled with the embedding rubber, so it is suitable for gas-conducting; in this case no "pipe in the pipe" structure is formed, because steel cord can be bonded with adhesion to the surrounding rubber layers.

Figure 4:
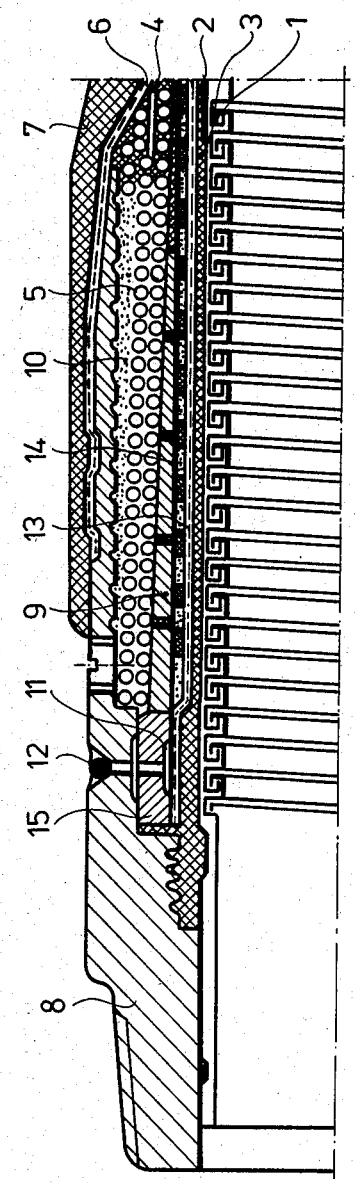
FIG. 4 is a side sectional view of the hose illustrated in FIG. 3 with a coupling.

In FIG. 4 the hose structure of FIG. 3 is shown as an embodiment with a coupling 8 and a glass-resin spiral 14. In this example the eduction of the gases flowing into the coupling takes place via a check valve 12 which prevents the penetration of the external media, for example, sea-water. Before educting the gas is accumulated in a chamber 11 formed in the drilled metal ring 15.

Figure 5:
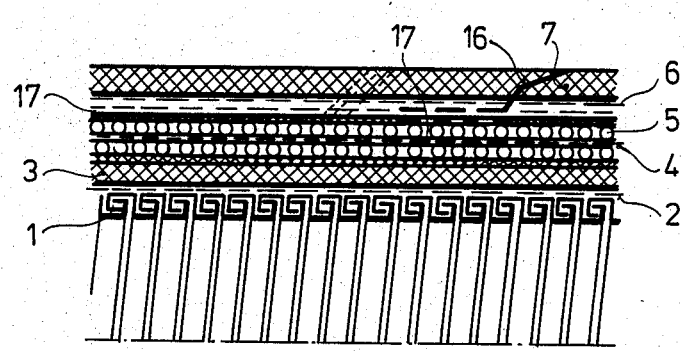
FIG. 5 is a side sectional view of an embodiment of this invention with an internal gas conducting layer.
Figure 6:
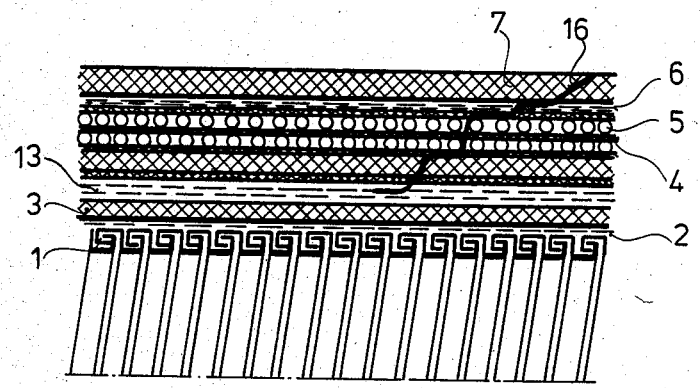
FIG. 6 is a side sectional view of an embodiment of this invention with an internal gas conducting layer having diagonal canals connecting the layer to the surface of the hose.

In FIGS. 5 and 6 hose structures are shown which can be used if the gas is not educted through the coupling or the eduction is accomplished not only through the coupling. In this example, canals are formed which can educt gases accumulated between the hose surface and the main reinforcing ply 5 or the internal gas-conducting layer 13. The canals can be made of nonrubberized textile cord, twine or fabrics or steel cords of loose structures, placed diagonally over the individual layers of the hose. In order to prevent the penetration of the external medium, for example sea water, the mentioned cord or fabrics are impregnated, preferably with a water-repellent material.

In FIG. 5, as an example, a fabric or cord 16 is built-in diagonally and connects the main reinforcing plies 5 with the surface of the hose. It educts the gases accumulated in the main reinforcing plies 5.

Gases accumulated in the wire cords 5 are collected by a narrow layer 17 of loose structure placed over and between the wire cord layer and the gases leave through canals 16 built-in diagonally. The narrow layer (casing ring) 17 can also be made, for example, of nonrubberized fabric. There can be used as educting canals holes or graps and check valves led diagonally and which are closed by external pressure, but are opened by internal gas pressure. The above described gas-educting means can be jointly or separately included In FIG. 6 diagonal canals 16 made preferably of cord connect the internal gas-conducting layer 13 with the surface of the hose.

What we claim is:

1. A high pressure-resistant multilayer hose structure having means to conduct and vent gases diffused into the body thereof from gas-containing media conveyed therethrough, said hose having a wall with exterior layers, reinforcing ply layers, gas conducting layers, low gas permeable layers, fabric layers, embedding layers and an internal backing layer, wherein
   (a) said internal backing layer is a flexible metal pipe within and concentric with the inner surface of said hose wall;
   (b) said flexible, low gas permeable layer is concentric with and is disposed between said internal backing layer and said reinforcing plies layer;
   (c) said fabric layer is disposed concentrically with and between the outer surface of the flexible metal pipe and said low gas-permeable layer;
   (d) said reinforcing ply layers are concentric with and are disposed between said low gas-permeable layer and said exterior layers, the reinforcing plies having gaps through which the gases diffused in the hose wall from the medium conveyed through the hose are vented from the interior of the hose wall;
   (e) embedding layers that are disposed between each layer of reinforcing plies concentric therewith and between the innermost reinforcing ply layer and said low gas-permeable layer and also are located between the outermost reinforcing ply layer and the outermost layers of said hose;
   (f) said exterior layers of said hose are a cover layer on a fabric carcass which is disposed around the outermost embedding layer.

2. A hose according to claim 1 wherein at least one extra gas-collecting and gas-conducting layer is disposed concentric with the hose wall and between the reinforcing ply layers and the inner low gas-permeable layer, and gases are vented from the interior of the hose wall through said gas-collecting and gas-conducting layer.

3. A hose according to claim 1 wherein a low pitch helix is disposed between the reinforcing ply layers and the low gas-permeable layer concentrically with said hose.

4. A hose according to claim 2 wherein a low pitch helix is disposed between the reinforcing ply layers and the low gas-permeable layer concentrically with said hose.

5. A hose according to claim 1 wherein said hose has a coupling on an end thereof, said coupling having a gas vent connected to said gas-conducting layer.

6. A hose according to claim 2 wherein said hose has a coupling on an end thereof, said coupling having a gas vent connected to said gas-conducting layer.

7. A hose according to claim 3 wherein said hose has a coupling on an end thereof, said coupling having a gas vent connected to said gas-conducting layer.

8. A hose according to claim 4 wherein said hose has a coupling on an end thereof, said coupling having a gas vent connected to said gas-conducting layer.

9. A hose according to claim 1 wherein said gases are vented through channels from the reinforcing ply layers through the exterior layers of said hose.

10. A hose according to claim 2 wherein said gases are vented through channels from the reinforcing ply layers through the exterior layers of said hose.

11. A hose according to claim 5 wherein said gas vent is a check valve.

12. A hose according to claim 2 wherein said gas-conducting layer is steel cord.

13. A hose according to claim 9 wherein the reinforcing and the gas-conducting layers are connected through said cover with the external surface of the hose by a gas-conducting fabric layer disposed diagonally therein.

14. A hose according to claim 2 wherein said gas-conducting layer is a nonrubberized textile.

15. A hose according to claim 9 wherein the reinforcing plies and the gas-conducting layers are conected through said cover with the external surface of the hose by gas-conducting canals made of textile cord yarns.

* * * * *